US011271920B2

(12) United States Patent
Arora et al.

(10) Patent No.: US 11,271,920 B2
(45) Date of Patent: Mar. 8, 2022

(54) METHOD AND SYSTEM FOR ACCOUNT SECURITY OF RECYCLED PHONE NUMBERS

(71) Applicant: MASTERCARD INTERNATIONAL INCORPORATED, Purchase, NY (US)

(72) Inventors: Ankur Arora, New Delhi (IN); Rakesh Patel, Haryana (IN); Shashank Kumar Trivedi, New Delhi (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 462 days.

(21) Appl. No.: 16/260,248

(22) Filed: Jan. 29, 2019

(65) Prior Publication Data
US 2020/0244642 A1  Jul. 30, 2020

(51) Int. Cl.
| | |
|---|---|
| *H04L 9/32* | (2006.01) |
| *H04L 29/06* | (2006.01) |
| *H04L 9/08* | (2006.01) |
| *H04W 4/14* | (2009.01) |
| *G06F 16/182* | (2019.01) |
| *H04L 9/30* | (2006.01) |
| *H04W 8/26* | (2009.01) |

(52) U.S. Cl.
CPC ...... *H04L 63/0807* (2013.01); *G06F 16/1824* (2019.01); *H04L 9/0861* (2013.01); *H04L 9/30* (2013.01); *H04L 9/3247* (2013.01); *H04W 4/14* (2013.01); *H04W 8/26* (2013.01); *H04L 2209/38* (2013.01)

(58) Field of Classification Search
CPC . H04L 63/0807; H04L 9/0861; H04L 9/3248; H04L 9/30; H04L 9/3239; H04L 9/3297; H04L 2209/38; H04W 4/14; H04W 8/26; H04W 8/265; G06F 16/1824
See application file for complete search history.

(56) References Cited

U.S. PATENT DOCUMENTS

| | | | |
|---|---|---|---|
| 2006/0206709 A1* | 9/2006 | Labrou | G06Q 20/4014 713/167 |
| 2007/0079362 A1* | 4/2007 | Lortz | H04L 9/3234 726/5 |
| 2009/0319781 A1* | 12/2009 | Byrum | H04L 51/00 713/156 |
| 2016/0007198 A1* | 1/2016 | Lacey | H04W 8/22 713/156 |

(Continued)

*Primary Examiner* — Khoi V Le
(74) *Attorney, Agent, or Firm* — Buchanan Ingersoll & Rooney PC

(57) ABSTRACT

A method for validating a message recipient includes: storing, in a memory of a processing server, a device profile, wherein the device profile is related to a mobile computing device and includes at least a device identifier, and token validation data; receiving, by a receiver of the processing server, a data signal from an external system that is encoded with a message packet, wherein the message packet includes at least the device identifier, a device token, and a content message; validating, by a processing device of the processing server, the device token using at least the token validation data; and electronically transmitting, by a transmitter of the processing server, the content message to the mobile computing device.

16 Claims, 5 Drawing Sheets

(56) References Cited

U.S. PATENT DOCUMENTS

| | | | |
|---|---|---|---|
| 2016/0119291 A1* | 4/2016 | Zollinger | H04L 9/3228 |
| | | | 713/171 |
| 2016/0358174 A1* | 12/2016 | Kassemi | H04L 67/02 |
| 2020/0296082 A1* | 9/2020 | Killoran, Jr. | H04L 63/08 |

* cited by examiner

METHOD AND SYSTEM FOR ACCOUNT SECURITY OF RECYCLED PHONE NUMBERS

FIELD

The present disclosure relates to providing security to recycled mobile phone numbers, specifically the use of unique tokens to validate data messages being sent to mobile computing devices that are invalidated upon recycling of the number associated with the mobile computing device to prevent the sending of sensitive data.

BACKGROUND

There are billions of mobile computing devices, such as cellular phones and smart phones, throughout the world. Each mobile computing device has a telephone number associated therewith. With the larger number of mobile computing devices and the limitations placed on what numbers may be used as a telephone number, in many countries there is a need to recycled old telephone numbers. When a phone number is no longer in use (e.g., it is surrendered by the individual that possess the mobile device to which it was assigned), it goes back into a pool of unassigned numbers that can then be assigned to a mobile device when a new number is requested.

Many services often rely on an individual's telephone number when providing services to the individual. For example, financial institutions often will send one-time passwords and other sensitive information to an account holder via their telephone number (e.g., through a short messaging service message). When an individual surrenders their telephone number, if they are not vigilant about updating their contact information with every single service that has it, there is a risk that a new person to whom their surrendered number is assigned may receive their sensitive data. In the above example, an unknown person may be receiving the individual's one-time password or other sensitive data related to their transaction account.

Thus, there is a need for a system where data messages that are being sent to a mobile computing device are validated prior to delivery such that they cannot be sent if the telephone number associated therewith has been surrendered and subsequently reassigned.

SUMMARY

The present disclosure provides a description of systems and methods for validating a message recipient. A unique token is assigned to a telephone number when it is assigned to a mobile computing device. Any service with which the telephone number is registered must possess the unique token in order to send data messages to the associated mobile computing device. The service sends the data message to a processing server along with the unique token. The processing server validates the unique token, such that the data message will only be delivered to the mobile computing device if the validation is successful. When the telephone number associated with the mobile computing device is surrendered, the unique token is cancelled and a new one generated when the number is reassigned. As a result, no messages from service providers will be sent to a telephone number once it has been surrendered, preventing the sending of sensitive data to an unauthorized party.

A method for validating a message recipient includes: storing, in a memory of a processing server, a device profile, wherein the device profile is related to a mobile computing device and includes at least a device identifier, and token validation data; receiving, by a receiver of the processing server, a data signal from an external system that is encoded with a message packet, wherein the message packet includes at least the device identifier, a device token, and a content message; validating, by a processing device of the processing server, the device token using at least the token validation data; and electronically transmitting, by a transmitter of the processing server, the content message to the mobile computing device.

A system for validating a message recipient includes: a memory of a processing server configured to store a device profile, wherein the device profile is related to a mobile computing device and includes at least a device identifier, and token validation data; a receiver of the processing server configured to receive a data signal from an external system that is encoded with a message packet, wherein the message packet includes at least the device identifier, a device token, and a content message; a processing device of the processing server configured to validate the device token using at least the token validation data; and a transmitter of the processing server configured to electronically transmit the content message to the mobile computing device.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

Figure 1:
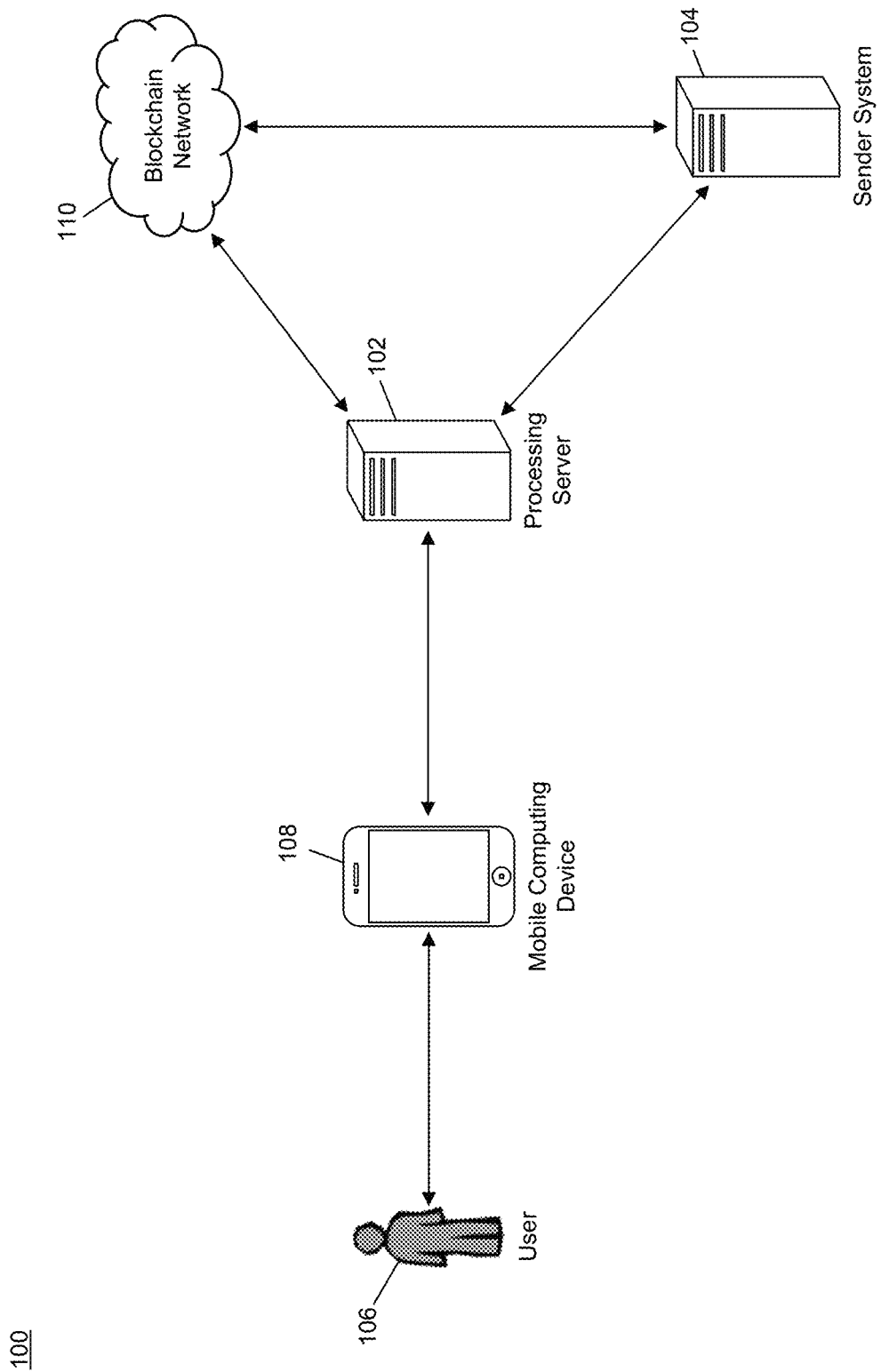
FIG. 1 is a block diagram illustrating a high level system architecture for validating message recipients in accordance with exemplary embodiments.

System for Validating Message Recipients for Security of Recycled Telephone Numbers FIG. 1 illustrates a system 100 for the validation of message recipients via the use of unique device tokens to prevent the delivery of data messages to a mobile computing device when the telephone number associated therewith has been reassigned.

The system 100 may include a processing server 102. The processing server 102, discussed in more detail below, may be configured to validate data messages that are being sent to a mobile computing device 108 to prevent the transmission of data messages thereto in cases where a telephone number has been reassigned. In the system 100, when a telephone number is assigned to a mobile computing device 108, a unique token is generated and associated therewith by the processing server 102. The unique token can be any type of digital token in any format that is suitable for use in performing the functions discussed herein. For instance, the unique token can be a 256-bit hexadecimal value, a 64 digit unsigned integer, etc. The processing server 102 may generate or otherwise identify the token that is assigned to the telephone number and may deliver the token to the mobile computing device 108 associated with the telephone number. As discussed herein, any valid device identifier may be used in place of a telephone number. Such device identifiers may be any unique value associated with a mobile computing device 108 or user 106, such as an e-mail address, media access control address, registration number, serial number, etc.

The mobile computing device 108 may receive the token that is associated with its assigned telephone number. A user 106 of the mobile computing device 108 may then provide that unique token to any sender system 104 with which the assigned telephone number is registered. For example, when the user 106 signs up for mobile alerts with their financial institution, the user 106 may provide their telephone number that is assigned to their mobile computing device 108 as well as the unique token associated therewith to the financial institution (represented in FIG. 1 by the sender system 104). The sender system 104 may then store the token alongside the other data associated with the user 106.

When the sender system 104 wants to send a data message to the mobile computing device 108, the sender system 104 must send the unique token along with the data message and the telephone number to which the data message is to be sent. In some embodiments, the sender system 104 may electronically transmit the data message and unique token directly to the processing server 102 for validation of the recipient thereof. In other embodiments, the sender system 104 may electronically transmit the data message and unique token to a mobile network operator (MNO) that operates a cellular network associated with the mobile computing device 108. In some such embodiments, the MNO may forward the data message and unique token to the processing server 102. In other such embodiments, the processing server 102 may be a part of the MNO and may validate the recipient of the data message as part of the transmission of the data message to the mobile computing device 108.

The processing server 102 may receive the data message and the telephone number transmitted by the sender system 104, as well as the token provided thereby. The processing server 102 may identify the unique token that was generated and assigned to the telephone number to which the data message is to be sent. The processing server 102 may then validate the token provided by the sender system 104. Validation of the token may include checking to see if the token provided by the sender system 104 is a direct match to the unique token that was assigned to the telephone number by the processing server 102. In some embodiments, the token may be a digital signature generated by private key of a cryptographic key pair. In such embodiments, the processing server 102 may generate the key pair comprised of a private key and a public key when the telephone number is assigned, and may provide the private key to the mobile computing device 108. The private key may be provided to the sender system 104 when the telephone number is provided, where the sender system 104 must, using the private key, generate a digital signature each time a message is to be sent. In these embodiments, validation of the data message may include validating the digital signature using the corresponding public key.

If the token provided by the sender system 104 is validated, then the processing server 102 may deliver the data message to the mobile computing device 108 using the telephone number. For instance, the data message may be a short messaging service (SMS) message that may be sent to the mobile computing device 108 via SMS after the token provided by the sender system 104 is validated. In some instances, the processing server 102 may provide the data message to the MNO associated with the mobile computing device 108 for delivery thereto. In cases where the MNO provided the data message to the processing server 102 for validation, the processing server 102 may return the result of the validation to the MNO, where the MNO may transmit the data message to the mobile computing device 108 if the result is that the validation was successful.

If the validation is unsuccessful, the data message may not be delivered. In such cases, the processing server 102 may electronically transmit a notification to the sender system 104 indicating that an invalid token (e.g., or digital signature, as applicable) was supplied. The sender system 104 may be free to re-attempt the transmission, or may attempt to contact the user 106 (e.g., through other means than the telephone number) to request an updated telephone number to associate with the user's account.

When a telephone number is surrendered by a mobile computing device 108, the processing server 102 may be notified (e.g., directly by the mobile computing device 108, via an MNO, or through a third party service). The processing server 102 may then invalidate the unique token associated with the telephone number or otherwise indicate that the unique token is no longer valid for that telephone number due to the surrender. As a result, any data message transmission to that telephone number that is attempted will fail validation, as the lack of a valid unique token associated with the telephone number will always result in a failed validation. Thus, no sensitive data can be sent to a telephone number after it has been surrendered, preventing the sensitive data from going to someone other than the user 106 registered with the sender system 104. When that telephone number is reassigned, a new unique token will be generated or otherwise identified by the processing server 102 and distributed to the telephone number. That new token will thus be sent to a new mobile computing device 108 (e.g., the new device to which the number has been reassigned) for providing to any sender systems 104. As a result, data messages will only be sent to the correct user 106. In addition, use of the telephone number rather than any data directly associated with the physical mobile computing device 108 ensures that the user 106 will still receive messages if they get a new mobile computing device 108.

In some embodiments, the system 100 may utilize a blockchain for storage of the unique tokens associated with telephone numbers. The blockchain may be operated by a blockchain network 110. The blockchain network 110 may be comprised of a plurality of nodes. Each node may be a computing system that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 110 prior to the generation and addition of a new block to the blockchain in order for the change to be made permanent. Computational and communication limitations may make such a modification exceedingly difficult, if not impossible, thus rendering the blockchain immutable.

Each blockchain data value may include a telephone number and the token assigned thereto. When a new token is assigned to a telephone number, the processing server 102 may electronically transmit the telephone number and new token to a node in the blockchain network 110 for inclusion in a new block added thereto. In some cases, the processing server 102 may be a node in the blockchain network 110. In further cases, the processing server 102 may be the sole node of the blockchain network 110, where the blockchain may be a private blockchain managed by the processing server 102. When a data message is received by the processing server 102 for validation of the intended recipient, the processing server 102 may identify the most recent block that includes a blockchain data value that includes the telephone number, and may use the unique token included in that blockchain data value for validation.

The methods and systems discussed herein provide for the validation of message recipients for data messages that are to be transmitted to a specific telephone number. The use of unique tokens by the processing server 102 ensures that sender systems 104 can only send data messages to a telephone number that is assigned and current. When a telephone number is surrendered by a user 106, no data messages can be sent to that telephone number anymore due to cancellation of the unique token. A new token is assigned to the telephone number when it is reassigned, such that a new user 106 that receives the reassigned telephone number can use the new token to ensure that they will not receive any unintended messages and that any sender systems 104 will only be able to transmit messages to their new telephone number.

Processing Server

Figure 2:
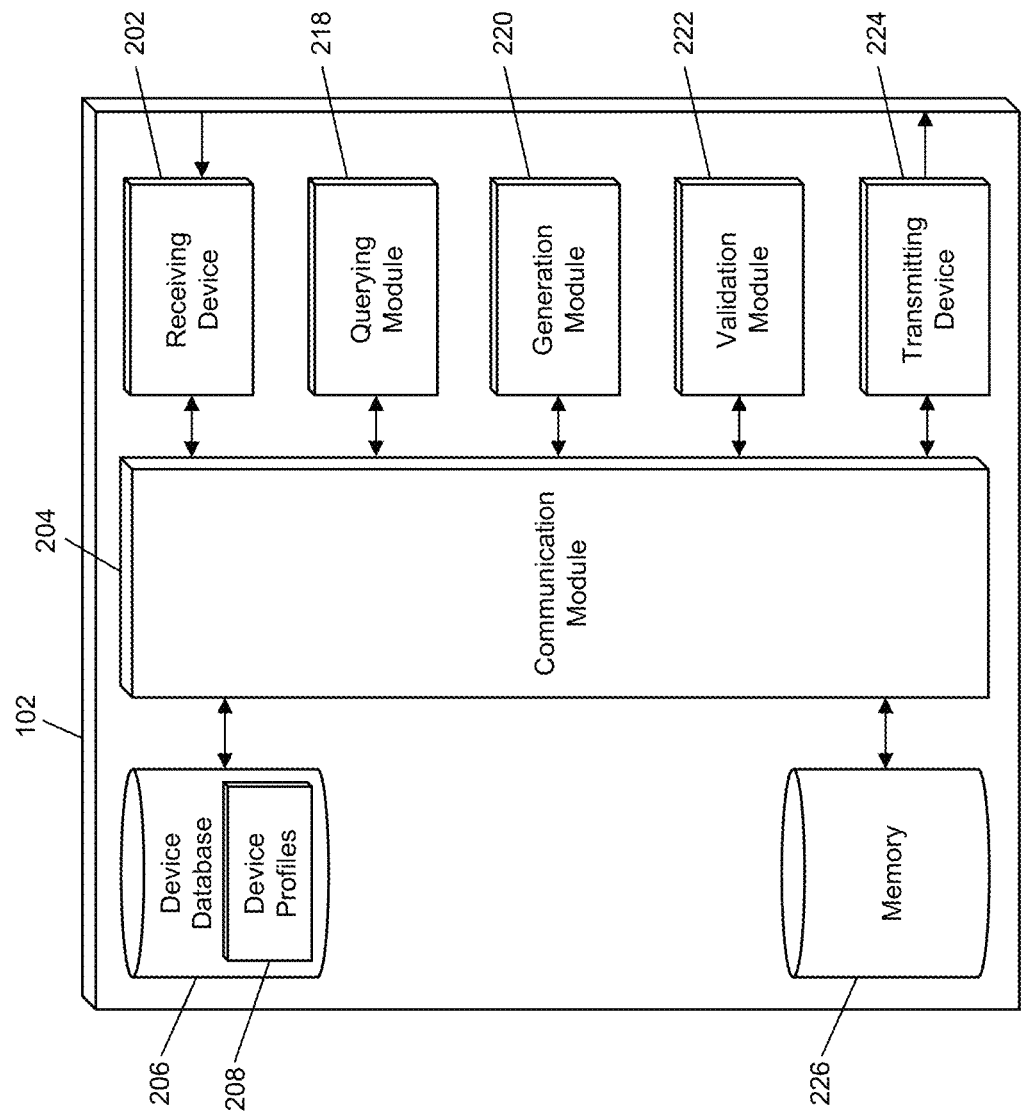
FIG. 2 is a block diagram illustrating the processing server of the system of FIG. 1 for validating message recipients in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from sender systems 104, mobile computing devices 108, blockchain networks 110, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by sender systems 104 and/or MNOs, which may be superimposed or otherwise encoded a telephone number, a device token, and a data message (also referred to herein as a "content message"). The receiving device 202 may also be configured to receive data signals electronically transmitted by mobile computing devices 108 or MNOs, which may be superimposed or otherwise encoded with a notification regarding surrender or reassignment of a telephone number, which may include the telephone number (e.g., or other device identifier, as applicable). In embodiments where a blockchain is used, the receiving device 202 may be configured to receive data signals electronically transmitted by nodes in a blockchain network 110 that may be superimposed or otherwise encoded with blockchain data, such as blocks blockchain data values or new blocks or blockchain data values for validation (e.g., in embodiments where the processing server 102 is a node).

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, validation module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include a device database 206. The device database 206 may be configured to store a plurality of device profiles 208 using a suitable data storage format and schema. The device database 206 may be a relational database that utilizes structured query language for the storage, identification, modifying, updating, accessing, etc. of structured data sets stored therein. Each device profile 208 may be a structured data set configured to store data related to a mobile computing device 108, user 106, or telephone number (e.g., or other device identifier), as applicable. Each device profile 208 may include, for example, a device identifier and token validation data. The token validation data may include the unique token assigned to the related telephone number or device identifier, or data associated therewith. For instance, in embodiments where a cryptographic key pair is used, the token validation data may be the public key used to validate a digital signature generated by the sender system 104 that is transmitted with the data message.

The processing server 102 may include a querying module 218. The querying module 218 may be configured to execute queries on databases to identify information. The querying module 218 may receive one or more data values or query strings, and may execute a query string based thereon on an indicated database, such as the device database 206, to identify information stored therein. The querying module 218 may then output the identified information to an appropriate engine or module of the processing server 102 as necessary. The querying module 218 may, for example, execute a query on the device database 206 to identify a device profile 208 that includes a telephone number that was received from a sender system 104, such as to identify the token validation data included therein to validate a device token transmitted by the sender system 104.

The processing server 102 may also include a generation module 220. The generation module 220 may be configured to generate data for use by the processing server 102 in performing the functions discussed herein. The generation module 220 may receive instructions as input, may generate data based on the instructions, and may output the generated data to one or more modules of the processing server 102. For example, the generation module 220 may be configured to generate notifications and other data messages for transmission to mobile computing devices 108 (e.g., for delivery of device tokens), to sender systems 104 (e.g., for failed validations), or to blockchain networks 110 (e.g., for new blockchain data values). In some cases, the generation module 220 may also be configured to generate device tokens, such as when a telephone number is reassigned to a new user 106, as well as cryptographic key pairs, if applicable. In embodiments where the processing server 102 is a node in a blockchain network 110, the generation module 220 may also be configured to generate block headers, blocks, hash values, and other data.

The processing server 102 may also include a validation module 222. The validation module 222 may be configured to validate data for the processing server 102 as part of the functions discussed herein. The validation module 222 may receive data to be validated as input, may attempt validation of the data, and may output a result of the attempted validation. In some cases, the validation module 222 may be provided with other data to be used in the validation. In other cases, the validation module 222 may be configured to identify (e.g., with the use of other modules and memory, such as the querying module 218 and device database 206) other data to be used in the validation. The validation module 222 may be configured to, for example, validate device tokens received from a sender system 104 by comparison thereof to a device token stored in a device profile 208 identified for a telephone number that accompanies the received device token. In embodiments where cryptographic key pairs may be used, the validation module 222 may be configured to validate digital signatures using public keys and appropriate signature generation algorithms.

The processing server 102 may also include a transmitting device 224. The transmitting device 224 may be configured to transmit data over one or more networks via one or more network protocols. In some instances, the transmitting device 224 may be configured to transmit data to sender systems 104, mobile computing devices 108, blockchain networks 110, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to sender systems 104 or MNOs that are superimposed or otherwise encoded with notifications regarding attempted validations, including validation results. The transmitting device 224 may also be configured to electronically transmit data signals to mobile computing devices 108, which may be superimposed or otherwise encoded with device tokens for distribution or data or content messages for delivery from a sender system 104. The transmitting device 224 may also be configured to electronically transmit data signals to blockchain networks 110 that may be superimposed or otherwise encoded with blockchain data values for inclusion on a blockchain.

The processing server 102 may also include a memory 226. The memory 226 may be configured to store data for use by the processing server 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, blockchain data, hashing algorithms for generating blocks, key generation algorithms, digital signature generation and validation algorithms, device token generation rules, cellular communication protocols, etc.

Process for Validation of Message Recipients

Figure 3:
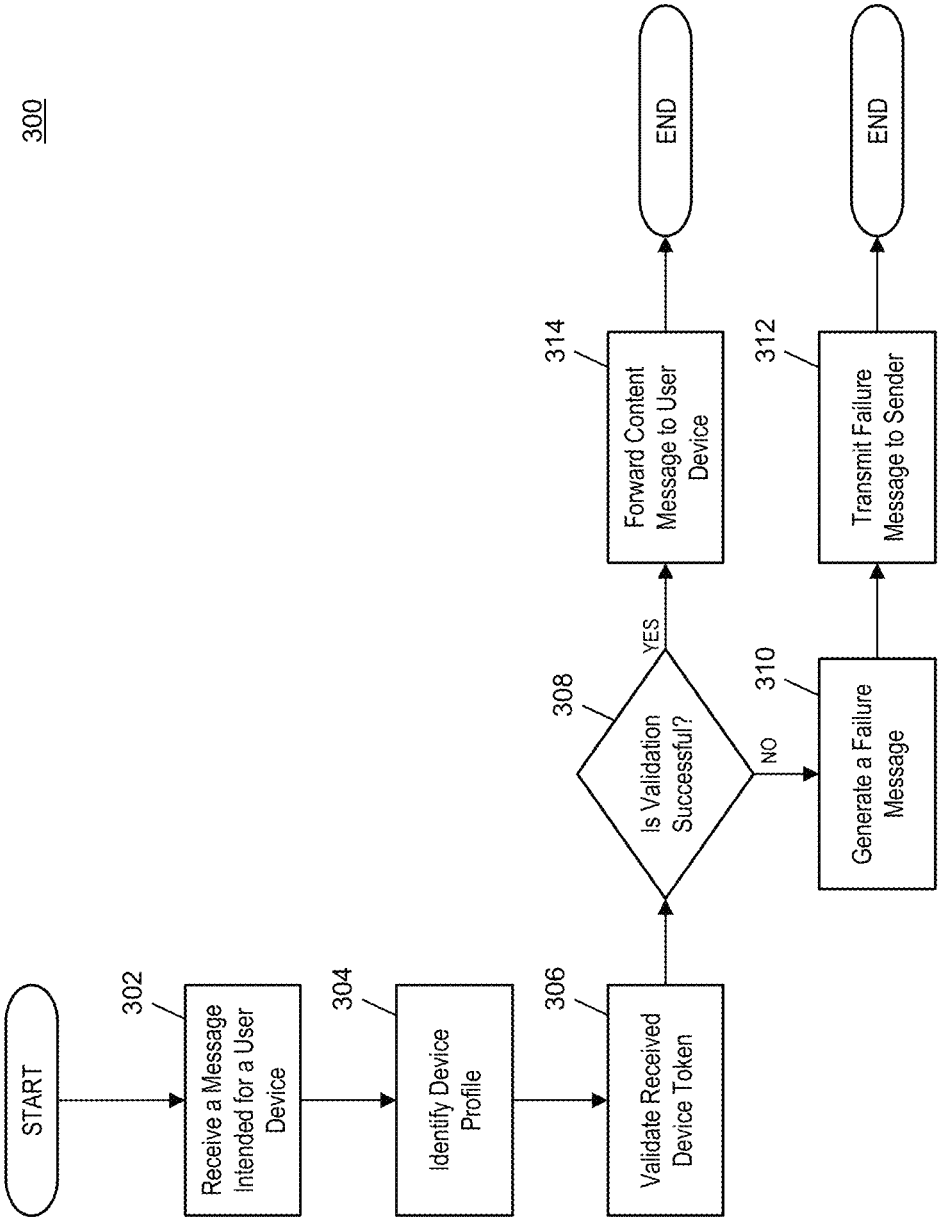
FIG. 3 is a flow diagram illustrating a process for validating a message recipient by the processing server of FIG. 2 in accordance with exemplary embodiments.

FIG. 3 illustrates an example process 300 for the validation of the recipient of a data message transmitted to a specific telephone number (or other device identifier, as applicable) as executed by the processing server 102 of FIG. 2 in the system 100.

In step 302, the receiving device 202 of the processing server 102 may receive a content message that is intended for a mobile computing device 108 via a specific telephone number. The content message may be accompanied by the telephone number as well as a device token. In some cases, the data may be transmitted directly to the processing server 102 by a sender system 104 via a suitable communication network and method. In other cases, the data may be transmitted to the processing server 102 from an MNO, which may receive the data from the sender system 104. In step 304, the querying module 218 of the processing server 102 may execute a query on the device database 206 to identify a device profile 208 that includes the telephone number received in step 302.

In step 306, the validation module 222 of the processing server 102 may validate the device token received in step 302 by checking it against the device token included in the identified device profile 208 to see if it is a match. In cases where a cryptographic key pair is used, validation of the device token may include validating a digital signature (as the device token) using a public key stored in the identified device profile 208. In step 308, the processing server 102 may determine if the validation was successful. If the validation was unsuccessful, then, in step 310, the generation module 220 of the processing server 102 may generate a failure message. In step 312, the transmitting device 224 of the processing server 102 may electronically transmit the failure message to the sender system 104 (e.g., or MNO, as applicable). If the validation was successful, then, in step 314, the transmitting device 224 of the processing server 102 may electronically transmit the content message to the telephone number (e.g., or to an MNO or other entity for forwarding thereto, as applicable).

Exemplary Method for Validating a Message Recipient

Figure 4:
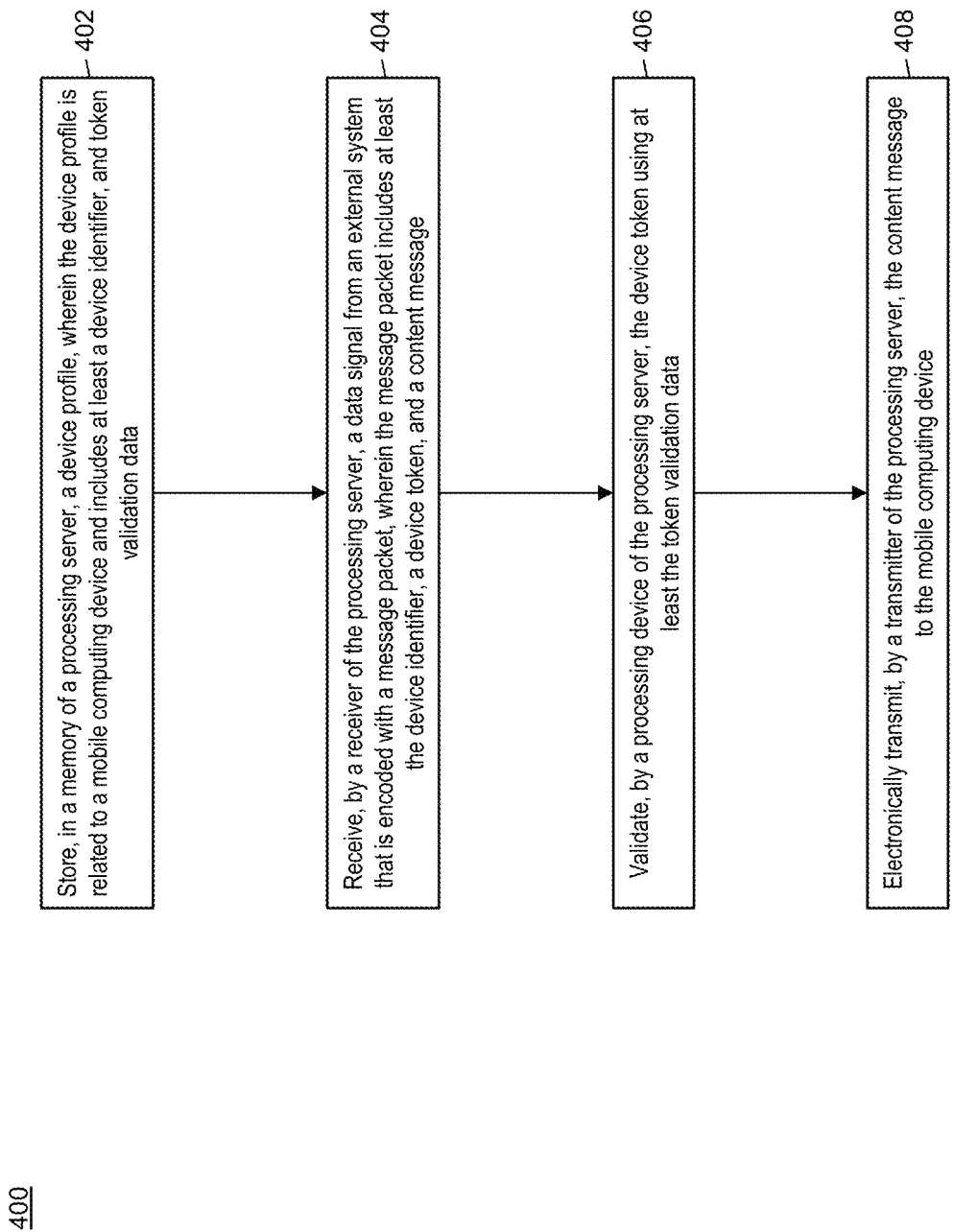
FIG. 4 is a flow chart illustrating an exemplary method for validating a message recipient in accordance with exemplary embodiments.

FIG. 4 illustrates a method 400 for the validation of a message recipient via the use of a unique device token associated with a device identifier to which the message is to be sent.

In step 402, a device profile (e.g., device profile 208) may be stored in a memory (e.g., the memory 226 or device database 206) of a processing server (e.g., the processing server 102), wherein the device profile is related to a mobile computing device (e.g., the mobile computing device 108 or a telephone number) and includes at least a device identifier, and token validation data. In step 404, a data signal may be received by a receiver (e.g., the receiving device 202) of the processing server from an external system (e.g., the sender system 104 or an MNO) that is encoded with a message packet, wherein the message packet includes at least the device identifier, a device token, and a content message.

In step 406, the device token may be validated by a processing device (e.g., the validation module 222) of the processing server using at least the token validation data. In step 408, the content message may be transmitted to the mobile computing device by a transmitter (e.g., the transmitting device 224) of the processing server.

In one embodiment, the device profile may be stored in a block of a blockchain. In a further embodiment, the token validation data may be the device token. In some embodiments, the method 400 may further include receiving, by the receiver of the processing server, a deactivation notification, wherein the deactivation notification includes at least the device identifier; generating, by the processing device of the processing server, a new device token and, based on the new device token, new token validation data; and replacing, in the device profile, the token validation data with the new token validation data.

In one embodiment, if validation of the device token fails, transmission of the content message to the mobile computing device may be replaced by electronically transmitting, by the transmitter of the processing server, a fail message to the external system. In some embodiments, the token validation data may be a validation token, and validating the device token may include determining that the device token is a direct match to the validation token. In one embodiment, the token validation data may be a public key of a cryptographic key pair, the device token may be a digital signature generated using a private key of the cryptographic key pair, and validating the device token may include verifying the digital signature using the public key. In some embodiments, the content message may be a short messaging service message.

Computer System Architecture

Figure 5:
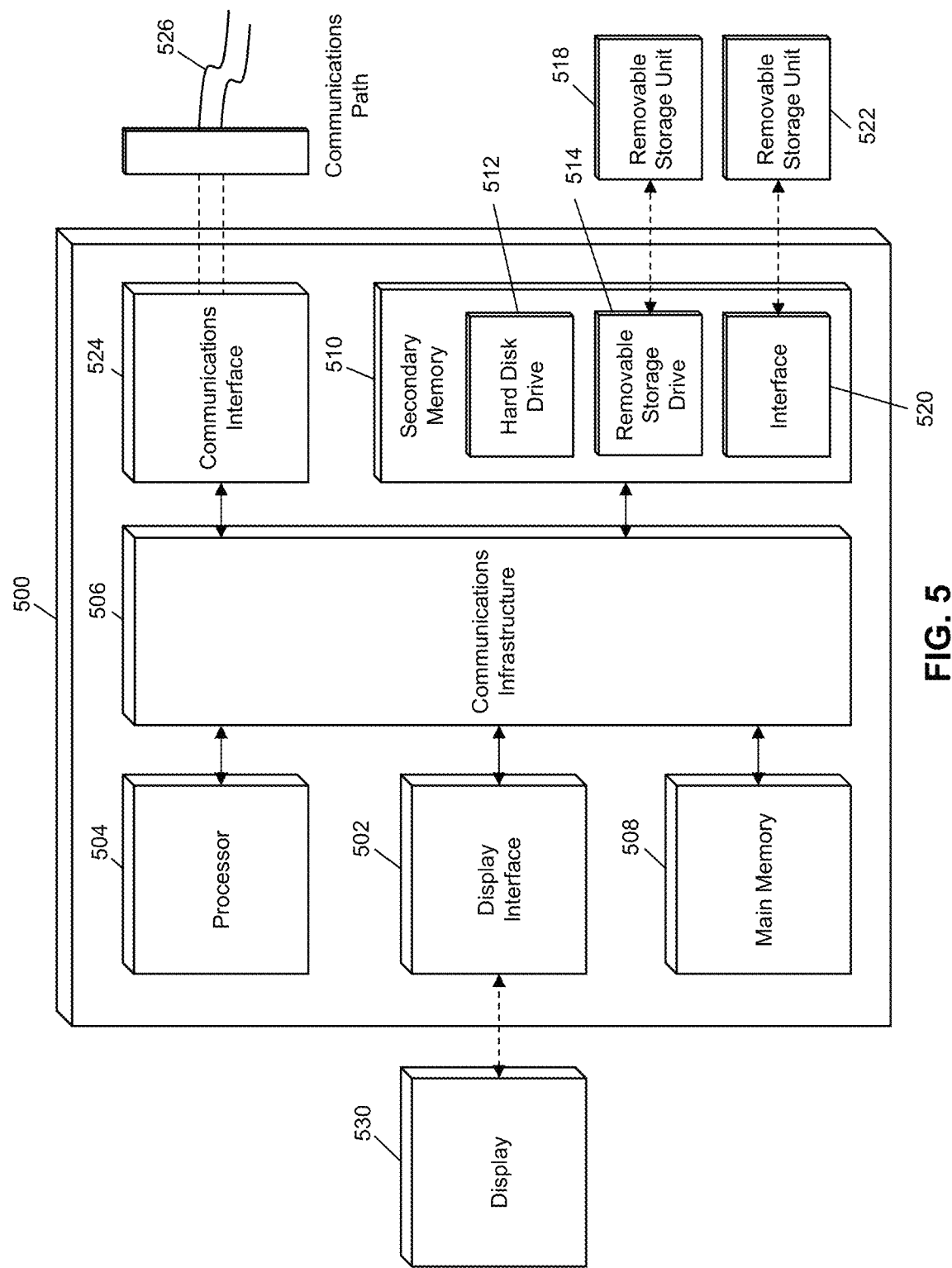
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for validating a message recipient. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for validating a message recipient, comprising:
    generating, by a processing server, token validation data specifically associated with a device identifier of a mobile computing device;
    storing, in a memory of a processing server, a device profile related to the mobile computing device, wherein the device profile includes at least the device identifier and the associated token validation data;
    receiving, by a receiver of the processing server, from an external system, a data signal for forwarding to a computing device associated with the device identifier, wherein the data signal is encoded with a message packet including at least the device identifier, a device token, and a content message;
    identifying, by the processing server, the token validation data stored in the memory of the processing server on a basis of the device identifier included in the message packet received in the data signal;
    validating, by a processing device of the processing server, the device token included in the message packet received in the data signal using at least the token validation data stored in association with the device identifier; and
    in response to validating the device token included in the message packet received in the data signal, electronically transmitting, by a transmitter of the processing server, the content message to the mobile computing device,
    whereby sending systems cannot send data messages to the mobile computing device when the device token is not validated.

2. The method of claim 1, wherein the device profile is stored in a block of a blockchain.

3. The method of claim 2, wherein the token validation data is the device token.

4. The method of claim 1, further comprising:
    receiving, by the receiver of the processing server, a deactivation notification, wherein the deactivation notification includes at least the device identifier;
    generating, by the processing device of the processing server, a new device token and, based on the new device token, new token validation data; and
    replacing, in the device profile, the token validation data with the new token validation data.

5. The method of claim 1, wherein, if validation of the device token fails, transmission of the content message to the mobile computing device is replaced by electronically transmitting, by the transmitter of the processing server, a fail message to the external system.

6. The method of claim 1, wherein the token validation data is a validation token, and
    validating the device token includes determining that the device token is a direct match to the validation token.

7. The method of claim 1, wherein
    the token validation data is a public key of a cryptographic key pair,
    the device token is a digital signature generated using a private key of the cryptographic key pair, and
    validating the device token includes verifying the digital signature using the public key.

8. The method of claim 1, wherein the content message is a short messaging service message.

9. A system for validating a message recipient, comprising:
    a processing device, of a processing server, configured to generate token validation data specifically associated with a device identifier of a mobile computing device;
    a memory, of the processing server, configured to store a device profile related to the mobile computing device, wherein the device profile includes at least the device identifier and the associated token validation data;
    a receiver, of the processing server, configured to receive, from an external system, a data signal for forwarding to a computing device associated with the device identifier, wherein the data signal is encoded with a message packet including at least the device identifier, a device token, and a content message; and
    a transmitter, of the processing server;

wherein the processing device of the processing server is further configured to:
  identify the token validation data stored in the memory of the processing server on a basis of the device identifier included in the message packet received in the data signal, and
  validate the device token included in the message packet received in the data signal using at least the token validation data stored in associated with the device identifier; and
wherein the transmitter of the processing server is configured to electronically transmit the content message to the mobile computing device in response to the processing device validating the device token included in the message packet received in the data signal,
whereby sending systems cannot send data messages to the mobile computing device when the device token is not validated.

10. The system of claim 9, wherein the device profile is stored in a block of a blockchain.

11. The system of claim 10, wherein the token validation data is the device token.

12. The system of claim 9, wherein
the receiver of the processing server is further configured to receive a deactivation notification, wherein the deactivation notification includes at least the device identifier,
the processing device of the processing server is further configured to
  generate a new device token and, based on the new device token, new token validation data, and
  replace, in the device profile, the token validation data with the new token validation data.

13. The system of claim 9, wherein, if validation of the device token fails, transmission of the content message to the mobile computing device is replaced by electronically transmitting, by the transmitter of the processing server, a fail message to the external system.

14. The system of claim 9, wherein
the token validation data is a validation token, and
validating the device token includes determining that the device token is a direct match to the validation token.

15. The system of claim 9, wherein
the token validation data is a public key of a cryptographic key pair,
the device token is a digital signature generated using a private key of the cryptographic key pair, and
validating the device token includes verifying the digital signature using the public key.

16. The system of claim 9, wherein the content message is a short messaging service message.

* * * * *